March 7, 1967 C. A. OWEN ETAL 3,307,392
AUTOMATIC PROTHROMBIN TIMER APPARATUS AND METHOD
Filed May 4, 1964 8 Sheets-Sheet 1

INVENTORS
CHARLES A. OWEN
JAMES ISAACSON
BY Dugger, Braddock,
Johnson & Westman
ATTORNEYS

March 7, 1967 C. A. OWEN ETAL 3,307,392
AUTOMATIC PROTHROMBIN TIMER APPARATUS AND METHOD
Filed May 4, 1964 8 Sheets-Sheet 4

INVENTORS
CHARLES A. OWEN
JAMES ISAACSON
BY Dugger, Braddock,
Johnson & Westman
ATTORNEYS

INVENTORS
CHARLES A. OWEN
JAMES ISAACSON
BY Dugger, Braddock,
Johnson & Westman
ATTORNEYS

INVENTORS
CHARLES A. OWEN
JAMES ISAACSON
BY Dugger, Braddock,
Johnson & Westman
ATTORNEYS March 7, 1967  C. A. OWEN ETAL  3,307,392
AUTOMATIC PROTHROMBIN TIMER APPARATUS AND METHOD
Filed May 4, 1964  8 Sheets-Sheet 7

INVENTORS
CHARLES A. OWEN
JAMES ISAACSON
BY Dugger, Braddock
Johnson & Westman
ATTORNEYS

FIG. 16

INVENTORS
CHARLES A. OWEN
JAMES ISAACSON
BY Dugger, Braddock,
Johnson & Westman
ATTORNEYS

United States Patent Office 3,307,392
Patented Mar. 7, 1967

3,307,392
AUTOMATIC PROTHROMBIN TIMER APPARATUS
AND METHOD
Charles A. Owen and James Isaacson, Rochester, Minn.,
assignors to Research Corporation, New York, N.Y., a
corporation of New York
Filed May 4, 1964, Ser. No. 364,564
24 Claims. (Cl. 73—64.1)

This invention relates to apparatus and method for determining what is known in medical arts as "prothrombin time." The "prothrombin time" test was originally designed to measure the concentration of prothrombin in plasma. This was important because of the concurrent discovery of vitamin K and of the hypothrombinemia resulting from a deficiency of vitamin K. Upon the discovery of Dicumarol, and other drugs of the type of coumarin and indanedione, the "prothrombin time" test became even more important. Despite the fact that the "prothrombin time" test is now known to measure other factors than prothrombin, this test is still a standard procedure throughout the world for controlling patients receiving coumarin and indanedione compounds. These drugs are administered for three reasons: (1) immediately after an operation to prevent the occurrence of thromboses; (2) whenever thromboembolic states do occur, and (3) on a long term basis to patients with unusual tendencies toward thromboses—notably patients with coronary heart disease.

The "prothrombin time" test is a measure of the clotting time of plasma to which a tissue thromboplastic suspension (brain or lung extract) has been added. The test is as follows: To one-half milliliter of M/10 sodium oxalate there is added 4.5 milliliter of freshly drawn venous blood. The plasma is separated from the cells by brief centrifugation. One-tenth milliliter of the oxalated plasma is mixed with 0.1 milliliter of thromboplastic suspension and then with 0.1 milliliter of M/40—M/50 calcium chloride (to overcome the oxalate added originally). The "clot time" is determined with the mixture maintained at 37° C. Depending upon the source and method of preparation of the thromboplastin suspension, normal plasma clots in 12 to 25 seconds. The test is reported as "clot time in seconds" or as a "percent of normal" the latter being based on a series of assumptions which are difficult to evaluate and are considered unreliable by some investigators.

According to the present invention, it has been discovered that the clotting time of plasma also yields a simultaneous change in its optical transmission. The initial change in such optical transmission was found to be expressed by an exponential curve of which the initial portion is concave upward. It was found that as clotting starts, the curve representing such light transmission through the plasma as it clots, after being initially concave upward, will then pass through a first point of inflection and then becomes concave downward. During this time, when the curve is concave downward, there is a marked decrease in optical transmission, which provides a reliable index of clotting time. After this downwardly concave portion has persisted a short time, the curve then passes through a second point of inflection and becomes concave upward and gradually becomes asymptotic to the time axis.

It was found possible simultaneously to observe the change in optical transmission and the actual clotting, by directing a small stream of air into the sample while measuring the optical transmission. According to the present invention, it has been discovered that prior to clotting, the air stream will cause observable turbulence in the plasma. Once clotting starts, the turbulence decreases rapidly to zero. And it was found that this decrease is coincident with the first point of inflection where the curve representing the optical transmission through the sample changes from concave upward and becomes concave downward.

In order to utilize the phenomenon of optical transmission as an index of clotting time, it was discovered that if the first derivative of the transmission is derived, that such first derivative may be usefully employed for time measurement of the invention. The first derivation function is achieved electrically by capacitively coupling the photocell output to a responsive amplifier, so that only the change in optical transmission through the sample will be measured. The resultant first derivative signal can then conveniently be read out by means of an ordinary sensitive meter.

It was further discovered that the time period (hereinafter called T1) elapsing from the time of mixing of the sample until the time at which the first derivative of the optical transmission curve reaches a "1st minimum" (in a negative sense) may be correlated with the clotting time as determined by standard "prothrombin time" tests and such time period T1 thus is a useful measurement. It was also discovered that the time period (hereinafter called T2) beginning at the time the sample is made, and ending at the time the first derivative of the optical transmission curve reach a "Maximum Subsequent to the 1st Minimum" (both in a negative sense) may also be utilized and that such time period T2 may be correlated with the clotting time as determined by already standardized "prothrombin time" tests as known in the medical arts and used as a useful measurement.

According to the present invention, the measurement of the time periods T1 and T2 as so specified, of clotting time, may be carried out by several novel methods and several novel apparatus.

It is an object of the present invention to provide proven apparatuses and methods for determining the time of clotting of blood plasma, sometimes called the "prothrombin time." It is another object of the invention to provide methods of determining the clotting time of blood plasma by passing light through the sample so as to provide a signal which is proportional to the amount of light transmitted, and determining the interval between the time the sample is prepared and the time when the first derivative of the light transmission curve representing the first derivative of the light transmission signal reaches a minimum, in a negative sense.

It is a further object of the invention to provide method and apparatus for determining the clotting time of blood plasma by passing light through the sample during clotting so as to provide a signal which is proportional to the amount of light transmitted, and determining the interval between the time the sample is prepared and the time when a curve representing the first derivative of the light transmission signal through the sample reaches a maximum after the first minimum of said signal, in a negative sense.

It is another object of the invention to provide an apparatus for automatically determining the clotting time of blood plasma which time is sometimes known as the "prothrombin time."

It is another object of the invention to provide an apparatus for automatically measuring prescribed amounts of reactant fluids and a sample of blood plasma, the clotting time of which is to be determined; automatically measuring the light transmission through the sample so prepared; automatically measuring the clotting time.

It is a further object of the invention to provide a machine wherein a plurality of sample cups successively usable, are, in succession, filled with a mixture of plasma and reactants for the measurement of the clotting time of the sample of blood plasma, sometimes known as the "prothrombin time," and as each sample is filed, measuring such clotting time and then advancing the sample cup and repeating the operation.

Other and further objects are those inherent in the invention herein illustrated, described and claimed and will be apparent as the description proceeds.

To the accomplishment of the foregoing and related ends this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated with reference to the drawings wherein:

FIGURES 8 through 17 show still another embodiment of the apparatus of the invention for carrying out the method of the invention automatically, and in which.

FIGURE 11 is a front elevational view of the portion of the apparatus shown in FIGURES 9 and 10, FIGURE 11 being a view in the direction of arrows 11—11 of FIGURE 10;

Throughout the drawings, corresponding numerals refer to the same parts.

In carrying out the invention, a plasma sample is first obtained by adding one-half milliliter of M/10 sodium oxalate to 4.5 milliliters of freshly drawn venous blood. The mixture is then briefly centrifuged to separate out the cells. The sample is maintained at a temperature of approximately 37° C. until the tests are completed. These are standard preparatory procedures and per se form no part of the invention.

For determining clotting time by the photoelectric methods of the present invention, a mixture is made of one-tenth milliliter of oxalated plasma and one-tenth milliliter of thromboplastin suspension to which one-tenth milliliter of M/40–M/50 calcium chloride is added, so as to overcome the oxalate originally added. The mixture is made in a small vial, which may for example be a cylindrical vessel of clear plastic material. While no particular dimensions for the vial are required, good results have been had utilizing a cylindrical cup of approximately seven millimeters inside diameter and nine millimeters depth, with a wall thickness of about 0.7 millimeter. The clotting time in seconds will vary from as low as about 15 seconds to as high as about 80 seconds.

Light transmitted through the mixture can be easily determined by means of a light source having a lens for focusing a beam directly against the side of the clear container in which the test mixture of plasma and test reactants is made. The amount of light passed through one wall of the container and thence through the mixture and out through the other wall of the container is measured photoelectrically by causing the light beam to fall on a photoelectric cell. The photocell provides a signal which is a measure of the light falling upon it, such photocell signal being referred to as the "primary signal." One photoelectric circuit of the invention is illustrated in FIGURES 6 and 7.

Figure 6:
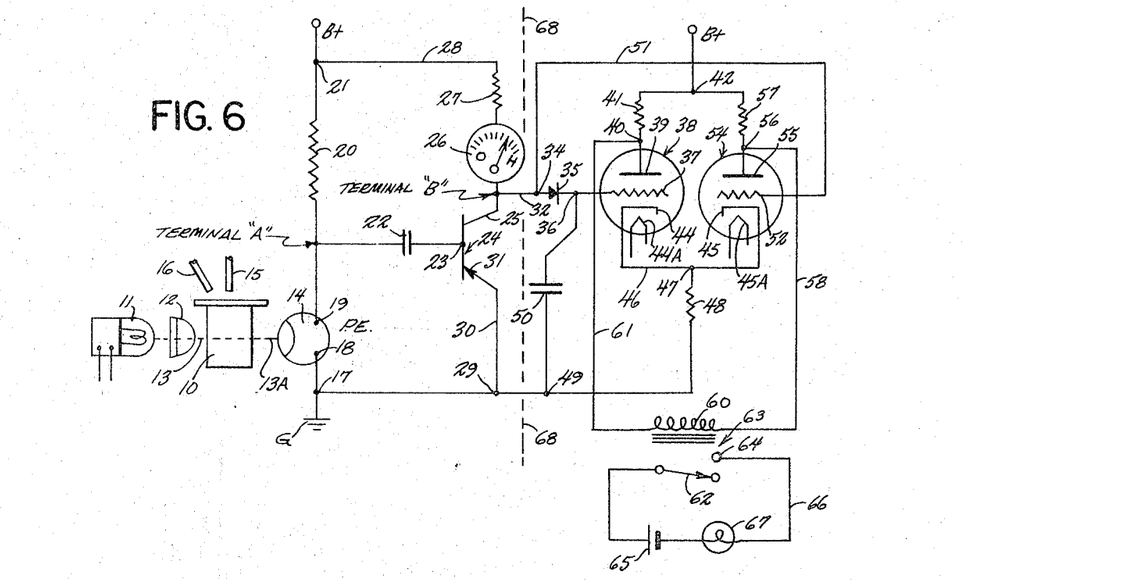
FIGURE 6 is a schematic diagram and wiring diagram illustrating one embodiment of the apparatus of the invention which can also be used in several ways for carrying out methods of the invention.
Figure 7:
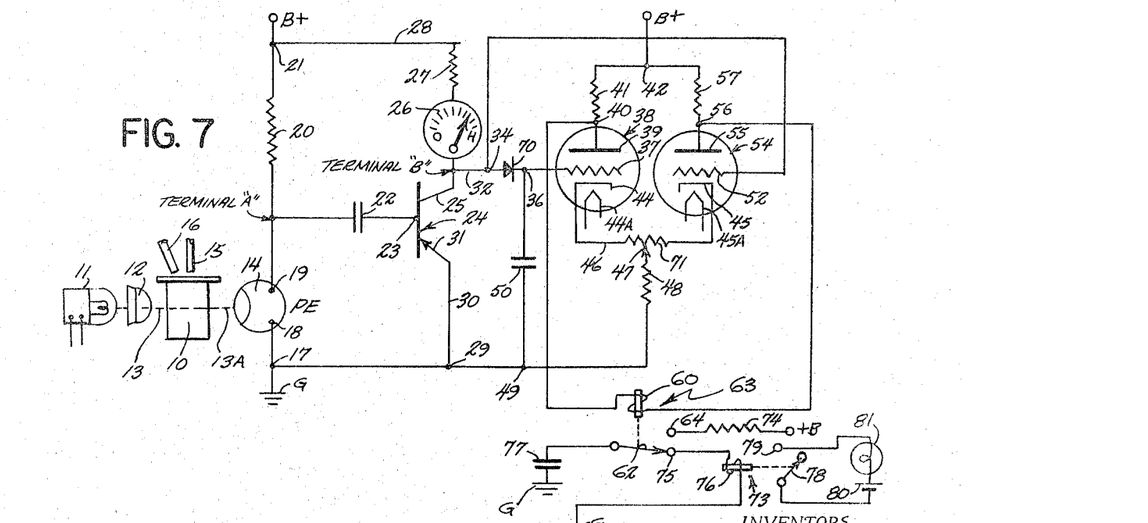
FIGURE 7 is a schematic illustration and wiring diagram illustrating another embodiment of the apparatus of the invention which can also be used in several ways for carrying out methods of the invention.

In FIGURES 6 and 7, the container 10 is arranged so that light from the source 11 focused by the lens 12 into a beam 13 will pass through the container and the liquid reacting mixture therein and thence continue at 13A and be received on the photoelectric cell 14. The tubes 15 and 16 are very small pipes (16 can be a coarse hypodermic needle) and are used to deliver, respectively, a mixture of plasma and thromboplastin suspension, and a solution of calcium chloride. These are the ingredients now standardized by the medical profession for making the "prothrombin time" test. It is within the purview of the invention to use other ingredients should they be selected and used for the test and the terms plasma and reactants will be understood to be the various liquids used for the test, whatever is selected by the medical profession.

According to this invention, it has been found that a blast of air through these tubes, following the delivery of measured quantities of the plasma and reactants, will assist in initiating the mixing at the outset of the clotting reaction. The mixture is maintained at approximately 37° C. throughout the entire operation by heating devices, not shown, which are in or on the cabinet 100.

Figure 16:
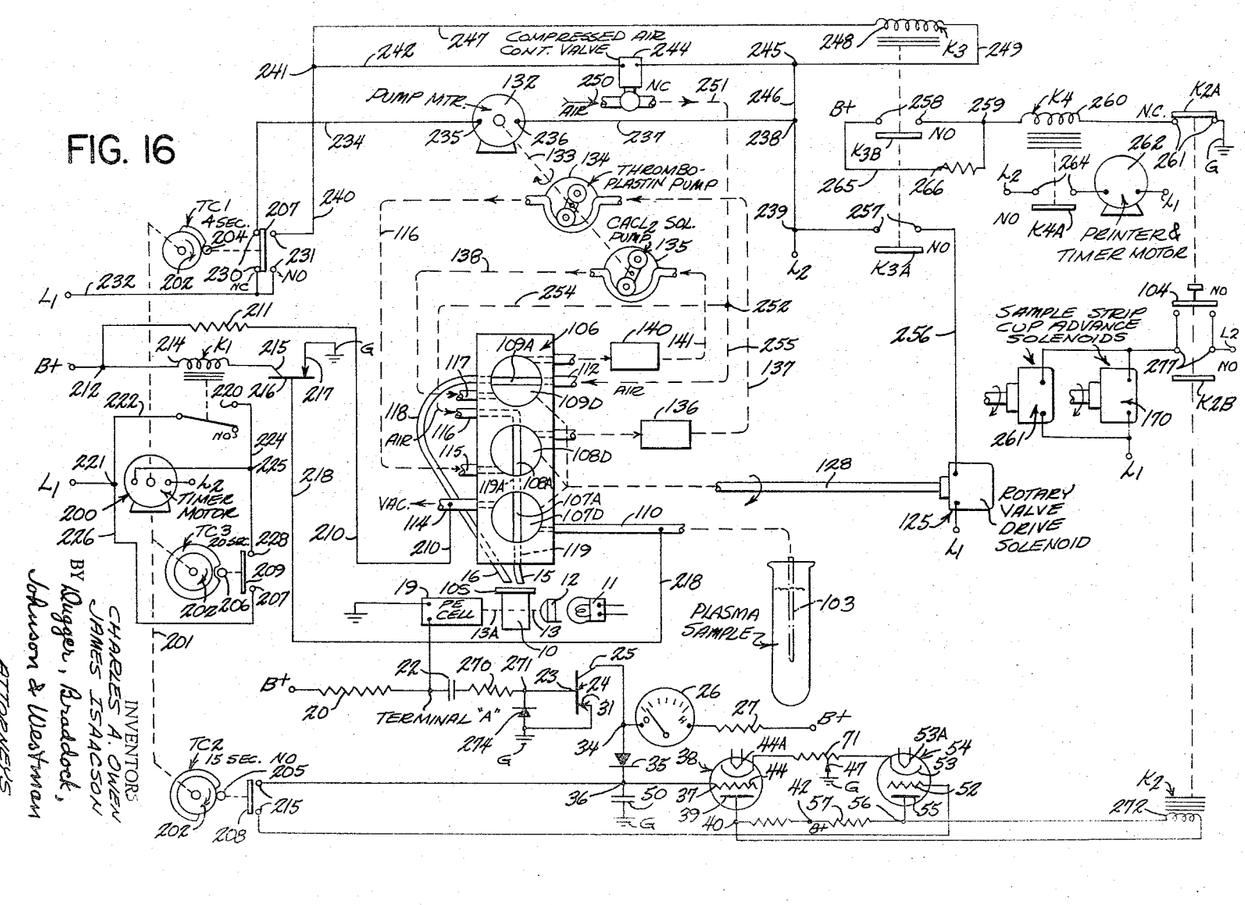
FIGURE 16 is a wiring diagram including some of the mechanisms schematically illustrated in a fragmentary manner; and, FIGURE 17 is a developed view of the timer switch cams.

As indicated in FIGURE 6, a circuit extends from ground G through junction 17 to terminal 18 of the photoelectric cell 14 and thence via terminal 19 to "Terminal A," from which the circuit extends via resistor 20 to junction 21 which is connected to power source B+. It will be understood, that in the circuit of FIGURE 6 and in the other circuits that will be described, viz. FIGURES 7 and 16, that the B— terminal of the power source is connected to ground G.

From Terminal A, a circuit extends through capacitor 22 to the input terminal 23 of transistor amplifier generally designated 24. The output circuit 25 extends to "Terminal B" and thence through an indicating meter 26 which can be simply a precision milliammeter to measure current flow, and thence through resistor 27 and line 28 to junction 21 and then to B+. The current flowing through meter 26 is hereinafter sometimes referred to as the "secondary signal." This signal is the "first derivative" of the primary signal. From junction 17, a circuit extends to junction 29 and thence via line 30 to the input 31 of the transistor amplifier 24. From Terminal B a circuit extends via line 32 to junction 34 and thence through a diode 35 which will permit current to flow from junction 34 to junction 36 but not in the opposite direction. From junction 36, a circuit extends to the control grid 37 of thermionic amplifier 38 having a plate 39 connected through junction 40 and resistor 41 and junction 42 to the B+ terminal. Amplifier 38 has a cathode 44 and a heater 44A. The cathode 44 is connected via line 46 to junction 47 and via resistor 48 and junctions 49 and 29 to ground. A capacitor 50 is connected between junctions 36 and 49. From junction 34 a circuit extends at line 51 to the grid 52 of a second thermionic amplifier generally designated 54 which is of the same type as 38. Amplifier 54 has a plate 55 which is connected through junction 56 and resistor 57 to junction 42 and thence to B+. From junction 56, a circuit extends via line 58 through the coil 60 of a relay 63, the other terminal of the coil being connected via line 61 to junction 40. The relay contact 62 is normally open, in respect to its contact 64 but when relay 63 is energized, contact 62 will close to contact 64, thereby completing a circuit from battery 65 through relay contacts 62 and 64 and thence via line 66 and signal lamp 67 to battery.

Figure 1:
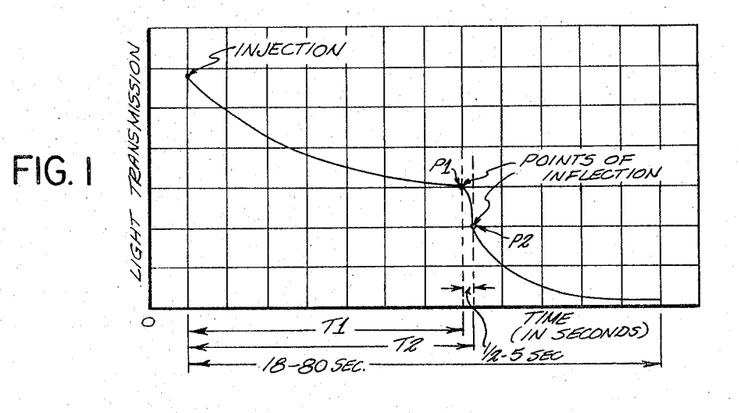
FIGURE 1 is a graph illustrating the light transmission signal, sometimes hereinafter called the "primary signal," on a time basis, through a sample mixture of blood plasma, thromboplastin suspension and an added reactant.

The light falling upon the photocell 14 determines its resistance and hence the output signal, i.e. the "primary signal." FIGURE 1 illustrates the light transmission, i.e. the primary signal, current flowing through the photocell. This current is proportional to the amount of light and the signal starts at a maximum amount which occurs at the time the three reactants, namely, plasma, thromboplastin dispersion and calcium chloride solution are simultaneously injected into the cup 10 thereby forming the reaction mixture. At this juncture, light transmission is a maximum, but it immediately begins to decrease as clotting ensues according to the shape of the curves of FIGURES 1 and 2. The "rate of decrease" of light transmission, i.e. the "first derivative," or secondary "signal," FIGURE 3 gradually decreases in a negative sense until the curve of light transmission (FIGURES 1 and 2) reaches the first point of inflection designated P1, which occurs at time coordinate T1, which is to say, the end of the time period indicated by dimension T1. Immediately after the point of inflection P1 has occurred, the amount of light transmitted through the mixture abruptly decreases, and the "rate of decrease" (i.e. the "first derivative," "secondary signal" see FIGURE 3) becomes greater (in a negative sense) until reaching a second point of inflection i.e. point P2 at time coordinate T2, after which time the light transmission through the cell and reaction mixture again gradually decreases along a curve (see FIGURES 1 and 2) which is asymptotic to the zero time axis.

The total time involved in the test will vary widely from a low of 15 to 18 seconds up to a high of 80 to 90 seconds. Therefore, the total time on the time axis in the graphs of FIGURES 1–5 of this disclosure are not intended to depict a particular scale. The amount of time between the time coordinates T1 and T2, which are respectively the two points P1 and P2 of inflection of the curve shown in FIGURES 1 and 2, will vary from about one-half second to about five seconds. Generally, if the total time is of a low order of magnitude, such as 15 to 20 seconds, then the time difference between P1 and P2 will also be smaller, such as in a range of about one-half second to one second, and when the total time is larger, such as 60 to 90 seconds, the time period between P1 and P2 will also usually increase to say 4 or 5 seconds. However, this is not a fixed rule and there are many variations.

In FIGURES 2 through 5, the time axis has been foreshortened at the break lines, as shown, since the portion of the curve of greatest interest is that portion containing the two points of inflection P1 and P2. At each of these points of inflection the curve reverses its direction of curvature. It has been discovered that these points of inflection P1 and P2 may be used as reference points, for purposes of measuring the end of what is known as clotting time or "prothrombin time." If the time measurement is begun at the time the mixture is made, here designated as the "injection" which is to say when the reactants are injected into the test container 10, and if time is then counted form such injection, up to either of the points P1 or P2, useful time measurements are obtained which may be correlated satisfactorily with the "prothrombin time" measurements as determined by a variety of other procedures, now used in the medical arts. Either the time period T1 (ending at P1) or the time period T2 (ending at P2) may be used since these are quite close together on the time axis. For most purposes, it is preferred to use the time period T1, since this is a measurement that can most readily be used.

Figure 2:
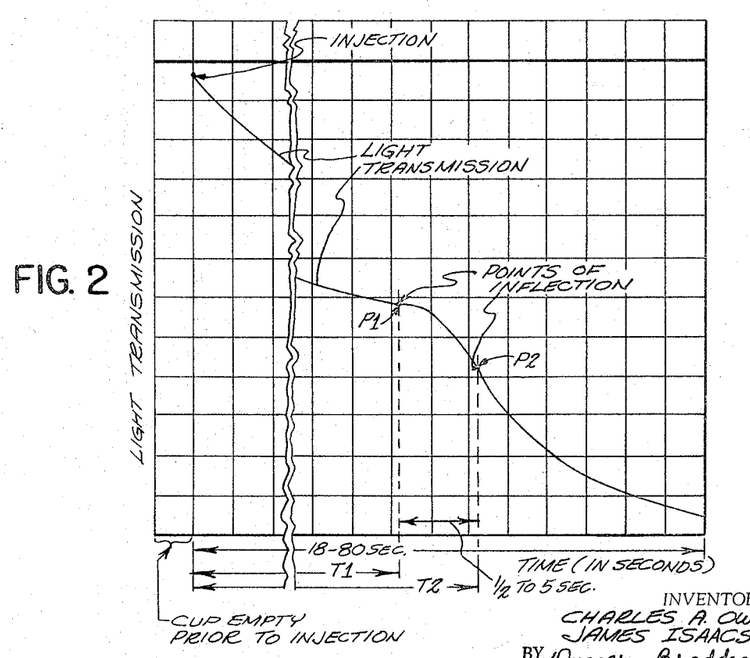
FIGURE 2 is a graph, corresponding to FIGURE 1 except that it is foreshortened on the time axis, i.e., in a direction from left to right, so as to illustrate on an enlarged scale those portions of the curve of FIGURE 1 at which points of inflection occur.

If a circuit such as shown in FIGURE 6 is provided, all portions of the circuit to the right of the dotted line 68—68 can be disregarded, and according to one method of the invention a useful time measurement can be made based upon the rate of change of light transmission as indicated by meter 26. This is done as follows:

It will be assumed that the photocell 14 is initially illuminated to its maximum value at the time the sample is prepared, i.e. "injection" in the curve, FIGURES 1 and 2. Then, as the clotting reaction progresses the light transmission will decrease, and less and less light will fall upon the cell 14. As the resistance of the photocell increases, the voltage at "Terminal A" will gradually shift towards the B+ potential, as shown by the graph, FIGURE 4. In FIGURE 4, the points of inflection are indicated at K1 and K2, corresponding respectively to P1 and P2 at the time coordinates T1 and T2. As the curve, FIGURE 4, approaches the point K1, the voltage is rising only very gradually, indicating that the "rate of decrease" (i.e. the "first derivative" or "secondary signal," FIGURE 3) is becoming less (in the negative sense), but not rapidly less. But, as the curve of FIGURES 1 and 2 dips sharply down inflection point P1, after completing the time period T1, the potential at Terminal A, FIGURES 6 and 4, will again begin to show a rapid shift, i.e. rise of voltage towards the B+ potential. Then, while the photocell 14 continues to be made darker, and at the time light transmission reaches point P2, FIGURES 1 and 2, marking the end of time T2, and beyond, the voltage at Terminal A (FIGURE 4) will still continue to shift towards the B+ potential, but at a less rapid rate than previously.

The voltage at Terminal A is transferred by the condenser 22 to the input at 23 on transistor amplifier 24. The transistor is a current amplifier. This means that the electron flow representing the voltage wave transferred by the capacitor 22 will be amplified in the output lead 25 and this is measured by the meter 26. Consequently, meter 26 indicates the rate of change of light transmission, i.e. the "first derivative" or "Secondary signal," and therefore by merely observing meter 26, during the time that clotting takes place one can, after some practice, determine the time measurement T1. Thus at the time of "injection," the meter needle will swing rapidly towards "high scale" (indicated at H on the meter). Then as the reaction proceeds the needle will gradually move over towards low scale (i.e. towards the zero on the scale) but it will not quite reach "zero" and the rate of approach toward zero decreases gradually until it is scarcely perceptible. Then very suddenly the meter 26 will swing towards high scale, indicating a high "rate of change" (secondary signal) and it will stay high for a short period, and then gradually again decrease. The most easily detectable indication on meter 26 which can be made observed directly occurs after the needle of the meter swings abruptly towards high scale (high "secondary signal") after having gradually approached zero (low scale). This "swing" towards high scale indicates the point of inflection P1 and it marks the end of the period T1, in FIGURES 1 and 2. After P1, it takes only a few seconds for the meter 26 to again reach a maximum which is at point P2, i.e. at end of time period T2 in FIGURES 1 and 2. This high scale (after minimum) occurs at the time the value of transmitted light is again decreasing rapidly. The "rate of decrease" has again increased and reached a "maximum after having passed the first minimum," see curve FIGURE 3. Therefore, either of these elements of behavior of the "secondary signal" may be utilized for determining the end of a time period T1 (or T2), and by utilizing the apparatus in this way, one may carry out one of the methods of the invention. Thus, merely by using a stopwatch which is started at the time of "injection" and which is stopped at P1 (or P2), as described, one obtains the T1 (or T2) measurement of time. Observation leading to measurement of T1 is a little more precise than measuring T2 by this method, but either can be done.

Figure 3:
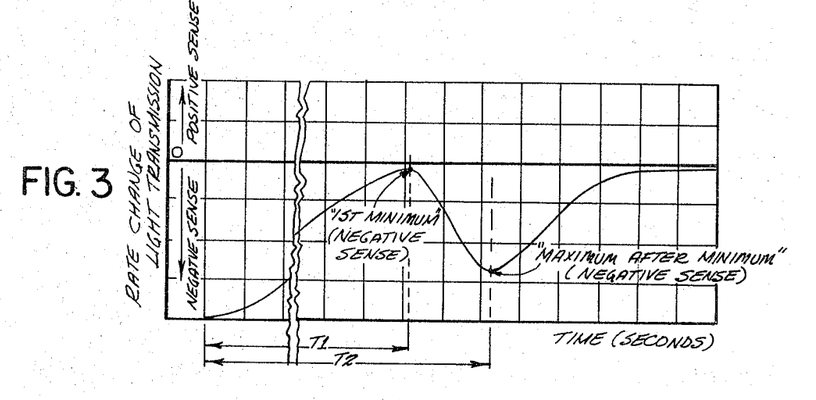
FIGURE 3 is a graph likewise foreshortened for the time axis showing the rate of change of light transmission signal, i.e., the "first derivative" signal, sometimes hereinafter called the "secondary signal," on a time basis, it being noted that this curve is in a negative sense the zero coordinate of light transmission being above the curve in this graph.
Figure 4:
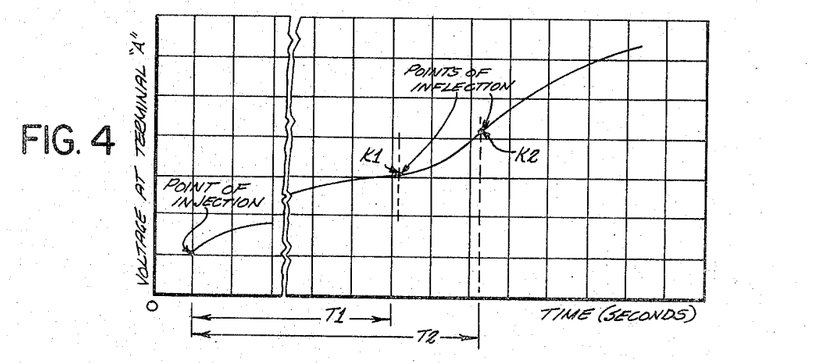
FIGURES 4 and 5 are graphs also foreshortened from left to right, illustrating voltages at certain "Terminal A" and "Terminal B," respectively, in the wiring of FIGURES 6 and 7.

FIGURE 3 shows the behavior of the rate of change of light transmission, i.e. the "secondary signal" or "first derivative" of the curve shown in FIGURES 1 and 2. In FIGURE 3, it will be noted that the rate of decrease of light falling onto the photocell is first rather large (in the negative sense) but becomes less and approaches finally the "1st minimum." Then the curve rather sharply becomes more negative reaching a "Maximum After 1st Minimum" (in the negative sense). Then the curve again asymptotically approaches the zero axis, from the negative direction. The "1st Minimum" of the first derivative of the light transmission signal i.e. the "secondary signal" is therefore at the point P1 (of FIGURES 1 and 2) and this is a time point that may be easily utilized in the time measurement T1. The "Maximum After the 1st Minimum" is another time point, i.e. P2, which may also easily be used for a time measurement T2. According to the present invention, either of these time points, P1 or P2, may be used as determining the end of a time measurement which will correlate with known measurements of the clotting time made by other procedures.

Figure 5:
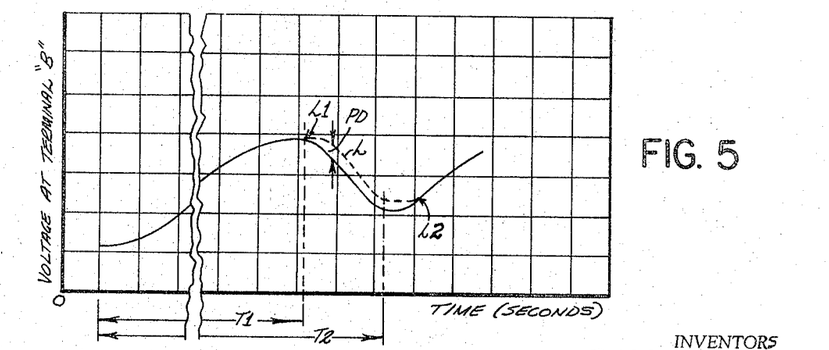

Referring again to FIGURE 6, the voltage at "Terminal B" is illustrated by the full line in FIGURE 5. This voltage is in an amplified sense, the "first derivative" or "secondary signal," FIGURE 3, and thereby shows a maximum at T1 and a minimum at T2. Since the diode 35 will pass current in the direction of grid 37, the grid 37 will faithfully follow the voltage at Terminal B (also junction 34) so long as the voltage is rising, but, due to the refusal of diode to conduct reversely, the voltage on the grid 37 will remain as high as it has previously been elevated, when, later on the voltage at Terminal B (and junction 37) again begins to decrease. The connection via line 51 brings the voltage of Terminal B directly to the grid 52 of amplifier 54 and since there is no diode in this connection it follows that grid 52 will be kept at the same voltage as at Terminal B when the voltage is rising and also when it is falling. Accordingly, as the voltage of Terminal B rises, the potentials of both of the grids, 37 and 52, will also rise and their amplifiers will pass equal currents through their plate circuits and consequently the two junctions 40 and 56 will be kept at the same voltage, and consequently no potential difference is available to be applied across the coil of relay 60. However, as the voltage at Terminal B begins to recede, the voltage on grid 37 will (because of the diode 35) remain elevated, whereas the voltage on grid 52 will recede, and consequently there will be a difference in current passed by the two amplifiers 38 and 54, and consequently the two junctions 40 and 56 will attain different potentials and a potential difference is accordingly applied across the coil 60 and relay 62 will operate. This causes the contacts 62 to close against contacts 64 and the light 67 will operate.

Therefore, the portion of the circuit to the right of the dotted lines 68—68 in FIGURE 6 is to provide a signal (i.e. to flash the lamp 67) so as precisely to indicate when the "sharp drop" in transmission of light occurs, denoting the end of time period T1. This dispenses with the necessity of closely watching the meter 26, which is a technique requiring some practice to learn and (due to the human element) inevitably induces errors.

Accordingly, another feature of the invention is that it is only necessary to make the mixture in the cup 10, and begin the timing by means of a stopwatch and then watch for the flash of the lamp 67. When the lamp flashes, the time period T1 has ended and this is the "prothrombin time" as determined by this invention. The potential of grid 37 will gradually re-stabilize via condenser 50, or the diode 34 can, if desired, be arranged so as to be manually shorted as by a normally open push button.

FIGURE 7 is the same as FIGURE 6 with the following changes. In place of simple diode 35 there is provided a diode 70, which is of the type of a six volt "Zener," or similar diode, which will not pass current in the "reverse direction" until the reverse potential across the diode has reached a certain prescribed amount. In this invention this reverse potential is chosen as six volts, and diode 70 is known as a "6 volt Zener" diode. Therefore, so long as the voltage at junction 34 is more than the voltage at junction 36, current will flow across the diode 70. However, when the potential at junction 36 begins to decrease, no current will flow from junction 34 to junction 36 until the voltage at junction 36 becomes six volts (or another selected voltage) more than the voltage at junction 34. Then the Zener diode 70 will pass current in the reverse direction always just enough to keep this differential potential in effect. Also, in FIGURE 7, a potentiometer resistor 71 is provided on line 46, with junction 47 in the form of a variable tap on this potentiometer. This is to permit careful pre-adjustment of the performance of the amplifiers 38 and 54, in case they should need adjustment. Also in FIGURE 7, the terminal 64 of relay 63 is connected via resistor 74 to B+ and terminal 75 of relay 63 is connected to the winding 76 of relay 73 and thence to ground G. The movable contact 62 of the relay 63 is connected to a condenser 77 which is also connected to ground G. The relay 73 is normally open having a movable contact 78, a fixed contact 79. These are connected through battery 80 and lamp 81 so that the lamp circuit will be closed when the relay 73 is energized. The net result of these changes is that the response curve of voltage at Terminal B will now follow the full line of the curve of FIGURE 5, until the point L1 is reached and thence will follow the dotted line curve L past time T2 until it again rejoins the full line curve at L2. The reason for this is that as the voltage at Terminal B rises, the two amplifiers 38 and 54 will each be energized equally as previously described and the voltages at junctions 40 and 56 will likewise be equal, thereby keeping the relay 63 in a de-energized condition. However, as the voltage at Terminal B begins to fall a potential difference will develop, due to diode 70 but this potential can only be the amount of the potential needed to make the diode conduct reversely, in this illustration, 6 volts. This voltage is represented by the dimension PD in FIGURE 5, between the dotted and full line curve of FIGURE 5. This potential difference will be maintained as the voltage at junction 34 decreases. Since the diode will always conduct enough in the reverse direction to lower the potential at junction 36 so that it is just PD volts higher than junction 34. Consequently, the dotted line curve will follow the path as illustrated, trailing the full line curve in a time sense. The amount of this potential difference PD can be made small. So long as the potential difference occurs between 34 and 36, there will always also be a potential difference developed between the junctions 40 and 56, and consequently the relay 63 will be energized, and as a result the potential from source B+ will flow via resistor 74 through contacts 64 and 62 to charge the condenser 77. This charge on condenser 77 builds and is maintained throughout all of the period when there is a potential difference PD between the dotted and full line portions of the curve in FIGURE 5. However, as soon as the voltage at Terminal B again begins to rise, the potential at junction 34 will quickly overtake the potential at junction 36, which is the point of intersection L2 as shown in FIGURE 5 and when this occurs, junctions 40 and 56 will again be at the same potential, relay 63 will become de-energized permitting its contacts 62 to fall against the contacts 75. The charge which has meanwhile been stored on the condenser 77 is then discharged through the relay 76, which being thereby energized, closes its contact 78 against contact 79 thereby completing the circuit through the lamp 81, causing the lamp to flash. As soon as the charge on condenser 77 has been discharged through the relay 76 will open and the lamp 81 will again be de-energized. The net result of this is that a flashing signal is given immediately after point P2 (FIGURES 1 and 2) has been reached, i.e., substantially at the end of the time period T2. The slight overrun time between the time T2 and the time of L2 is a negligible amount as compared with time T2, and in any event can be reduced by reducing the reverse bias PD of diode 70. The potential PD and the overrun time (portion of L2 to the right in FIGURE 5) have both been exaggerated in FIGURE 5, in the interests of clarity of illustration.

Therefore, FIGURE 6 illustrates instrumentation whereby a method using merely the meter 26 can be conducted to denominate the times T1 or T2 or (by using all of the FIGURE 6 circuitry) a signal is furnished denominating the end of the time period T1 whereas FIGURE 7 shows instrumentation providing a signal denominating the end of the time period T2. It is a matter of choice which of these time periods T1 or T2 is utilized. The instrumentation is a little simpler in FIGURE 6, and for most purposes the time period T1 will be more easily co-ordinated with "prothrombin time" determinations which have been made by other methods used in the medical profession. Measurement of the time period T1, using the full instrumentation of FIGURE 6 or as hereinafter described relative FIGURES 8–17 are preferred, but all described methods are features of the invention.

Figure 8:
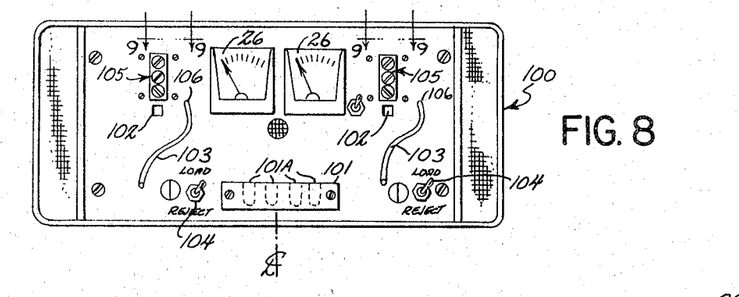
FIGURE 8 is a front elevational view of the housing and control panel of this embodiment, it being noted that FIGURE 8 is a double unit being duplicated to the right and left of the center line CL.

In the device shown in FIGURES 8 through 17 there is illustrated a form of the invention whereby carrying out of the test for "prothrombin time" is made with great facility and largely automatically. In FIGURE 8 there is shown the front elevation of the cabinet of the device. This is a "double" machine and may be considered as two machines in one housing, one on each side of the centerline CL. Only one machine therefore, need be described. The cabinet 100 is provided with automatic temperature control, not illustrated, which maintains the temperature at approximately 37° C. On the front of the cabinet there is a rack 101 having a number of recesses 101A in which vials containing already prepared plasma may be situated. Rack 101 is made of heavy metal and it is in heat communication with temperature regulated heating devices of the cabinet 100, so that the vials will be maintained at a temperature of around 37° C. while they are awaiting testing. In the front of the cabinet there is also a window 102 for each machine through which a plastic strip having a plurality of plastic cups (containers) integrally formed therein, are ejected. The strip (see FIGURES 12A–12D) simply come forward, one cup at a time from window 102 after being used. After one strip is used, another strip may be loaded into the back of the machine and are left a little while, long enough so that it will warm up and not disturb the test. Above each window 102 is an opening through which a valve mechanism generally designated 105 is visible. Out of each aperture 106 there hangs a flexible tube 107 which may be dipped into one of the vials containing the plasma sample situated in rack 101, so as to suck up the sample of fluid plasma into the measuring valving mechanism 105, preparatory to being later on ejected into one of the cups of the strip at aperture 102. Also on each machine there is the meter 26, and control switch 104, which is a manual over-ride switch for manually operating the cup ejecting mechanism.

Figures 13, 14, 15:
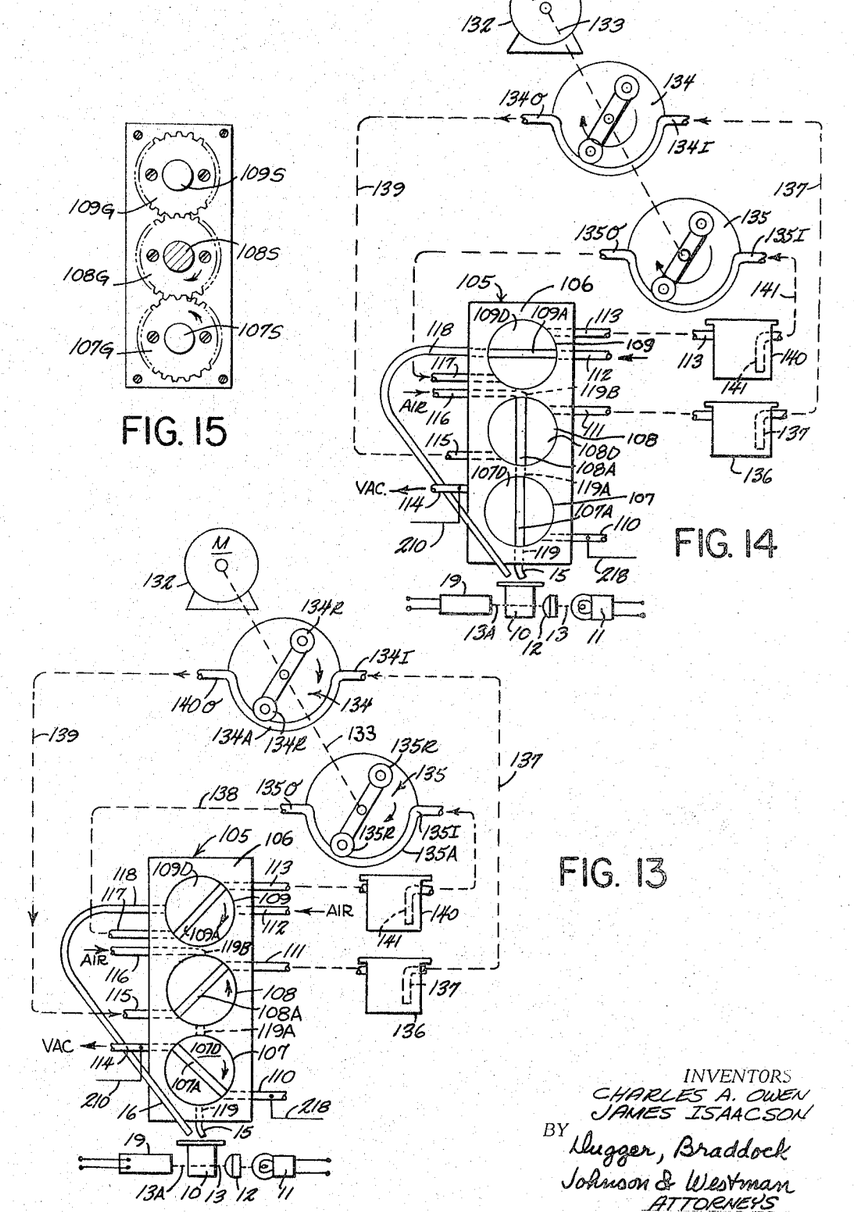
FIGURES 13 and 14 are related front elevational views, partly schematic, showing the automatic measuring and valving devices for first measuring quantities of the plasma, thromboplastin, and chemical reactants and then injecting them into a test cup, preparatory to measurement of the time interval. It will be noted that FIGURES 13 and 14 duplicate a portion of the apparatus shown in the front view, which is FIGURE 11.
FIGURE 15 is a vertical sectional view taken in the direction of arrows 15—15 of FIGURE 9 and illustrates the gearing by means of which the valving elements in the apparatus shown in FIGURES 11, 13 and 14 are rotated simultaneously.

Referring to FIGURES 8 through 11, the valve mechanism generally designated 105 (a part of which is visible through the front of the cabinet) comprises a rectangular valve plate 106 of plastic, the front dimensions of which can best be seen in FIGURES 13 and 14. This sheet of plastic has three circular valve apertures therethrough at 107, 108 and 109. Through the edge of the plastic sheet there are drilled apertures, into each of which there is inserted a stainless steel tube as at 110, 111, 112, 113, 114, 115, 116, 117 and 118. Endwise through the bottom edge of the plastic sheet there is drilled an aperture at 119, which also extends through the valve aperture 107 and at 119A extends to the valve aperture 108 and thence a short distance at 119B where it intersects bore connected to the tube 116. In each of the valve apertures 107, 108 and 109 there is positioned a valve disc as at 107D, 108D and 109D. Each of these discs has a diametrical aperture (borehole) therethrough. On the backside of the valve discs 107D, 108D and 109D there is an integral stub shaft 107S, 108S and 109S, respectively (see FIGURE 15) and on each of these stub shafts there is positioned a gear as at 107G, 108G and 109G, respectively, the gears being held in place by small screws so that they turn with the discs to which they are mounted. The gears intermesh and when any one of these gears is turned, all of them will turn together, the direction of rotation being shown by the arrows in FIGURES 13 and 15. It may be noted that FIGURE 15 is a view from the reverse side and the direction of rotation is hence reversed as compared to FIGURE 13. In FIGURE 13, the valve discs 107D, 108D and 109D are shown in one position (preparatory) and the direction-of-rotation arrows in FIGURES 13 and 15 show the direction the valve discs will turn (45°) to reach the position of FIGURE 14, which is the delivery or "injection" position. The diametrical apertures at 107A, 108A and 109A are related to the apertures in the valve block 106, so that there are two positions of operation for each of the three valves. These two positions are illustrated in FIGURES 13 and 14. The positions of the valves and the fluid circuits that are thereby established will be more fully described hereinafter.

Figure 9:
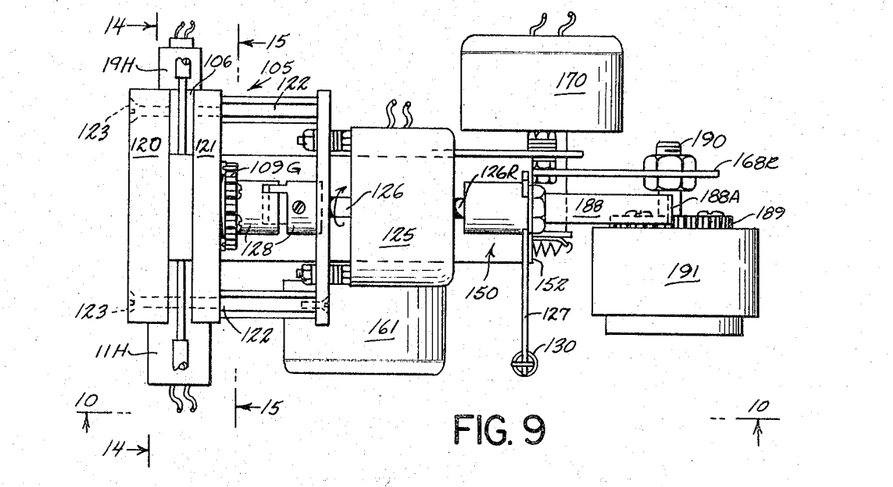
FIGURE 9 is a fragmentary portion of the apparatus shown in FIGURE 8, after the housing has been removed, the portions shown in FIGURE 9 being what is seen when the apparatus is viewed in the direction of arrows 9—9 of FIGURE 8, it being noted that there are two such apparatus of FIGURE 9, one on each side of the centerline CL in FIGURE 8.
Figure 10:
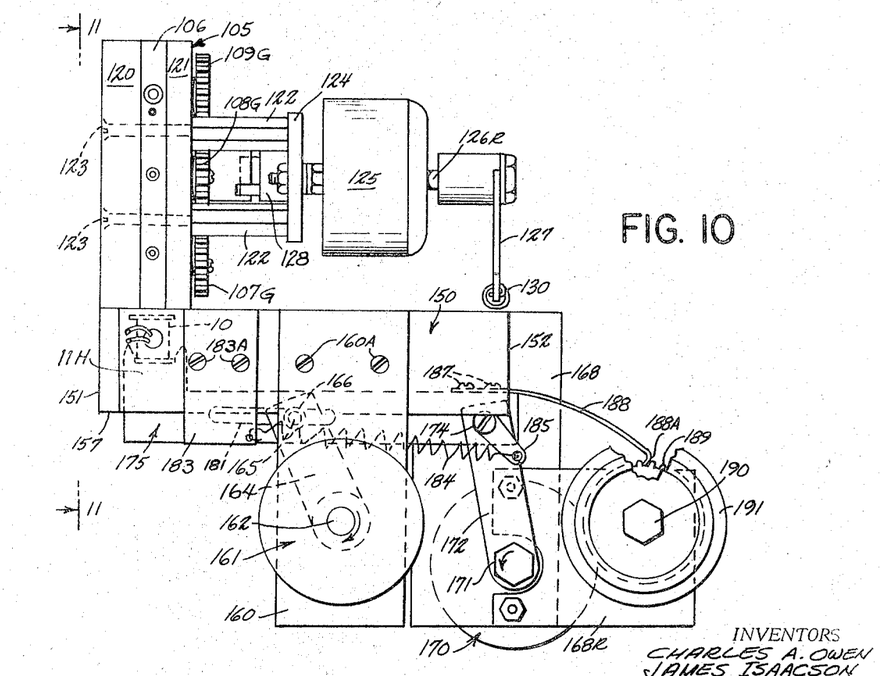
FIGURE 10 is a side elevational view of the portion of the apparatus shown in FIGURE 9 taken in the direction of arrows 10—10 of FIGURE 9.

The valve block 106 is held between a front plastic clamping plate 120 and a rear metal clamping plate 121. The plates 120, 106 and 121 are held together as by screws 123. To the rear plate there are attached four rearwardly extending posts 122 which terminate in a mounting plate 124 on which a rotary solenoid 125 is attached by its mounting screws. The rotary solenoid 125 has a forwardly extending shaft at 126 and a rearwardly extending shaft at 126R to which a crank arm 127 is attached, for receiving one end of a spring 130 for retracting the solenoid 125 to one of its limiting positions. The shaft 126 is connected through the connector 128 to the drive gear 108G of the central valve disc 108. The rotary solenoid shaft has only a limited angular rotation. When de-energized, spring 130, FIGURES 9 and 10, return the solenoid shaft (and valves) to the position shown in FIGURE 13. This rotary solenoid 125, is a standard article of manufacture and need not be described in detail. In one limiting position, which is when the solenoid is de-energized, shaft 126 positions the central valve shaft 108S and valve gear 108G and valve disc 108D, and through the gearing shown in FIGURE 15, hence positions valve discs 107D and 109D all in the position shown in FIGURE 13. This position is established by retraction spring 130 as shown in FIGURES 9 and 10. When the solenoid 125 is energized, all valve discs 107D, 108D and 109D will be moved to the position shown in FIGURE 14.

Referring to FIGURES 13, 14 and 16, the apparatus also includes a motor 132 which is connected by shaft 133 to separate fluid pumps 134 and 135. These pumps include a flexible tube 134A and 135A against which rollers 134R are adapted to roll and consequently force the liquid in the flexible tube along the length of the tube, thereby providing a pumping action. As shown in FIGURES 13 and 14, from the output 134O of pump 134, a tube 139 extends to the inlet tube 115 of the valve 108. The outlet tube 111 of the same valve delivers to reservoir 136 into which the liquid is discharged. From the reservoir 136, a suction line 137 extends to the inlet 134I of the pump 134. Similarly, in respect to pump 135 from the outlet 135O a line extends at 138 to the inlet 117 of the valve 109. The outlet tube 113 of the valve 109 delivers to reservoir 140. A suction line 141 extending into the reservoir connects to the inlet 135I of the pump 135.

Consequently, with the motor 132 operating the pump 135 and with valve disc 109D set as shown in FIGURE 13, fluid will be withdrawn from the reservoir 140, (which contains the calcium chloride solution) and it is pulled through the line 141 into the inlet 135I of the pump 135 and thence is discharged via the outlet and line 138 into the tube 117 leading to the valve disc 109D where it passes through the valve passage 109A and thence to the outlet 113 where it is returned to the reservoir 140. This circulation will continue so long as the valve disc 109D is in the position shown in FIGURE 13. Similarly, with the valve disc 108D as shown in FIGURE 13, and the motor 132 and pump 134 operating, thromboplastin dispersion is drawn from the reservoir 136 via the line 137 and into the inlet 134I of the pump 134 and then is discharged through the outlet 134O via the line 139 and into the inlet 115 leading to the valve disc 108D where it passes through the valve passage 108A and is discharged via the outlet 111 into the reservoir 136. Consequently, so long as the motor 132 and pump 134 are operating, thromboplastin dispersion will be circulated through the valve disc 108D. Lines 112 and 116 are connected to an air line, through which air under pressure is admitted, via a valve 244 (see FIGURE 16), that will be described, and a vacuum source is connected to the line 114. To the line 118 a connection is made to the tube 16, which can be a coarse hypodermic needle. This needle is mounted by locating it in a drill hole through the corner of the plastic block 106, so that the needle terminates close to the lower end of the tube 15 which is connected to the borehole 119, below the valve disc 107D.

To the tube 110 there is attached the flexible tube 103 which extends through the front of the cabinet, see FIGURE 8. This is the suction tube which can be dipped into the sample of plasma to be tested.

Assuming that the test is to be made, vacuum is applied to the tube 114. Meanwhile, the motor 132 is operating and assuming that the tanks 136 and 140 are full of their intended materials (thromboplastin dispersion and calcium chloride solution respectively) these liquids will be in continuous circulation through valve discs 108D and 109D respectively, thereby providing a certain measured charge of such liquids continuously in the boreholes 108A and 109A of such valves. Then, when a test is to be made, the flexible tube 103 is dipped into a sample of plasma and the vacuum which is applied to the tube 114 causes the plasma to be drawn up through the tube 103 and the tube 11, through the borehole 107A of the valve 107D and thence into the vacuum line 114. The plasma which is to be tested establishes an electrical circuit from the tube 110 to the tube 114 and this is the starting signal, which is utilized through control mechanisms which will be described. These tubes 110 and 114 are preferably of stainless steel and electrical connections 210 and 218 are made to them as shown in FIGURE 16.

When the plasma is sucked up through tubes 103 and 110 and then through the borehole 107A and thence through to the tube 114, the plasma will establish an electrical circuit, and this provides a signal which, among other things causes the energization of the rotary solenoid 125, and consequently, the valve discs 107D, 108D and 109D are quickly rotated from the position shown in FIGURE 13 to the position shown in FIGURE 14. As soon as the valves reach such position shown in FIGURE 14, air which has simultaneously been applied to the tubes 112 and 116 by operation of valve 224, see FIGURE 16, will in respect to the valve 109, cause the measured charge of calcium chloride solution which has been trapped in the borehole 109A, to be forceably ejected along the tube 118 and thence through the tube 116 and into the cup 10. Simultaneously, air entering the tube 116 will blow the trapped amount of liquid thromboplastin in the borehole 108A downwardly and thence through the connecting borehole 119A into borehole 107A of valve disc 107D thereby forcing the charge of plasma, which has likewise been trapped in the borehole 107A, ahead of it. The two liquids (plasma followed by thromboplastin) will be discharged via the borehole 119 and the tube 115 into the cup 10. The discharge of the liquids from the tubes 15 and 16 is very rapid and is followed by a blowing of air outward through these tubes, which helps to mix the liquids together when they are discharged into the cup 10 thereby assisting in establishing a sharp starting point for the testing operation. This starting point, or time, is called "injection" (into the cup).

Figures 11, 17:
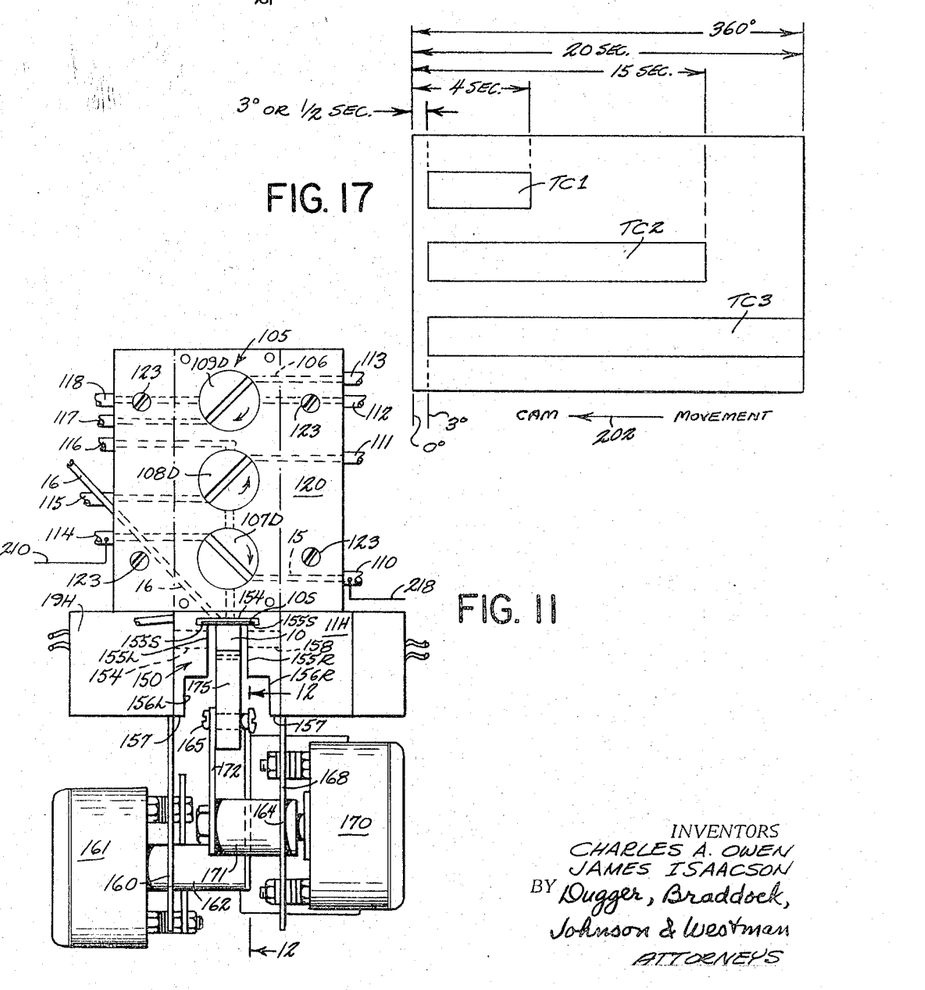

The arrangement for supporting and handling the cup 10 is illustrated in FIGURES 9–10 and 12A–12D. To the lower end of the valve back plate 121 there is attached a frame channel generally designated 150 which is of rectangular cross-section shape on the outside, and has a front surface 151 which coincides with the front surface of the valve plate 120. The back surface of the channel is at 152. Referring to FIGURE 11, the channel is provided with a smooth inner upper surface 154 which is wide enough so as to receive in sliding arrangement the full width of the strip 10S on whch the successive, downwardly hanging cups 10 are integrally formed. Then, inside of the channel there are two flanges 155R and 155L which present upper sliding surfaces 155S—155S on which the edges of the connecting strip 10S of the cups is adapted to slide. These flanges 155R and 155L extend down and then at the bottom the channel is widened to provide inner surfaces at 156R and 156L, for clearance purposes. At the front of the channel, and directly under the valve plate 106 (see FIGURES 9 and 10) there are provided transverse apertures 158 and 159 (see FIGURE 11) which are aligned coaxially and positioned at such an elevation that the cups 10 of the strip, when it is positioned directly below the valve plate 106, will also be in a position to receive the injection of plasma thromboplastin and calcium chloride solution from the tubes 15 and 16 and also be viewed by the light beam 13-13A (see FIGURES 13, 14 and 16). On the right side of channel 150, at the location of aperture 158 (see FIGURES 9-11) there is provided a housing 11H in which the lamp 11 and lens 12 are positioned so that they will direct a beam of light axially through the aperture 158 and against the adjacent side of the cup 10. At the other side of channel 150, at the aperture 159, there is provided a housing 19H which contains a photoelectric cell 19, also positioned so as to receive onto its active surfaces that the beam of light transmitted through the cup and the reactants therein. Therefore, when a cup 10 is positioned directly under the valve plate 106, and has been filled with the reacting mixture, it is also in a position to have light transmitted through it. This position is maintained until the plasma has clotted and the "prothrombin time" has been determined. Then the entire strip having the filled cup (or cups) and empty cups in succession, is advanced forward.

In order to accomplish the advancement of the strip there is provided the following mechanism. At the rear end of the channel 150, at one side there is provided a downwardly extending frame plate 160 attached by the screws 160A. This frame plate serves as a mounting for a rotary solenoid 161 of the same type as 125, having a shaft 162 thereon. Shaft 162 is provided with a crank arm 164 which has at its upper end a pivot screw 165 on which a pivot roller 166 is rotatably mounted. At the opposite side of the channel 150 there is another downwardly extending frame plate 168 having rearward extension 168A, see FIGURES 9 and 10, on which another similar rotary solenoid 170 is attached. Solenoid 170 has a shaft 171 on which a crank 172 is attached for rotation with the shaft. At the upper end of the crank there is a pivot 174. On pivot 174 there is pivotally attached a reach arm generally designated 175 which extends forwardly and has an upwardly extending front end portion 176 which is provided with a perch surface 177 defined by the front and rear prongs 178. The reach arm 175 has a thickness as shown in FIGURE 11, about as thick as the outer diameter of the cups 10 on the strip 10S. The perch surface 177 is provided with a soft pad 180, and this pad is adapted to engage in succession the lower flat surface of the cups 10. The two prongs 178, front and back, on the perch surface 177 and pad 180 are spaced apart a little more than the diameter of the cup. Between the ends of the reach arm 175 there is an elongated slot 181 in which the roller 166 is adapted to operate. Each of the rotary solenoids 161 and 170 has internal stops (not shown) which limit the motion of their shafts 162 and 171 respectively. A small frame plate 183 (see FIGURE 10) attached by the screws 183A to one side of the channel 150, serves as a front end anchorage for the spring 184 and to crank arm 172 on solenoid shaft 171 there is attached an ear 185 (see FIGURE 10) to which the opposite end of spring 184 is attached. Spring 184 causes the crank arm 172 to be pulled in a counter clockwise direction (as shown by the arrow on shaft 171) to the front stop-limited position as illustrated in FIGURE 10 and in FIGURE 12A.

Figure 12A:
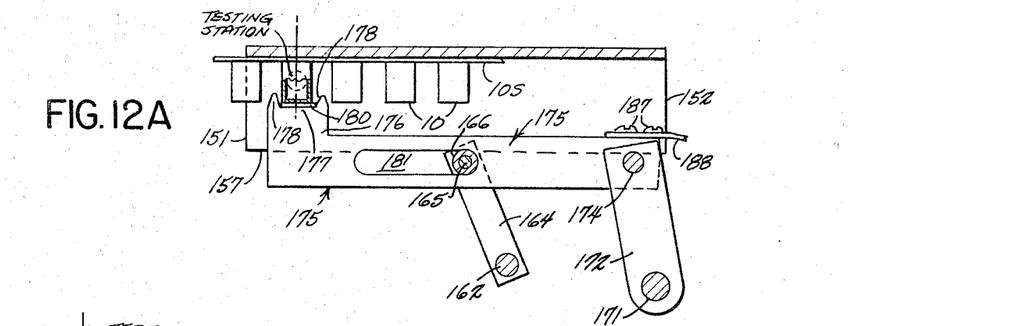
FIGURES 12A through 12D are a series of enlarged fragmentary vertical sectional views showing a part of the apparatus illustrated in FIGURES 9–11, particularly the portion of the apparatus that advances the strip of test cups of the apparatus.
Figure 12B:
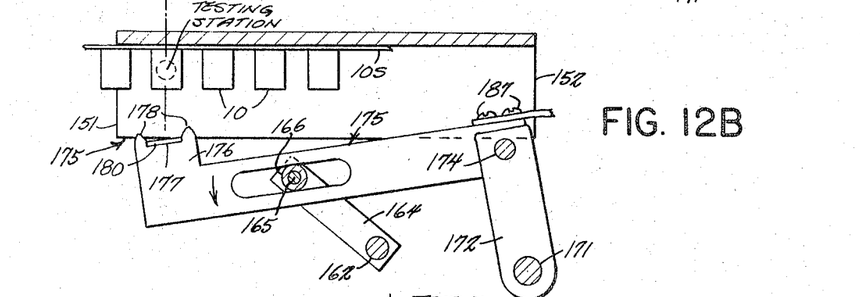
Figure 12C:
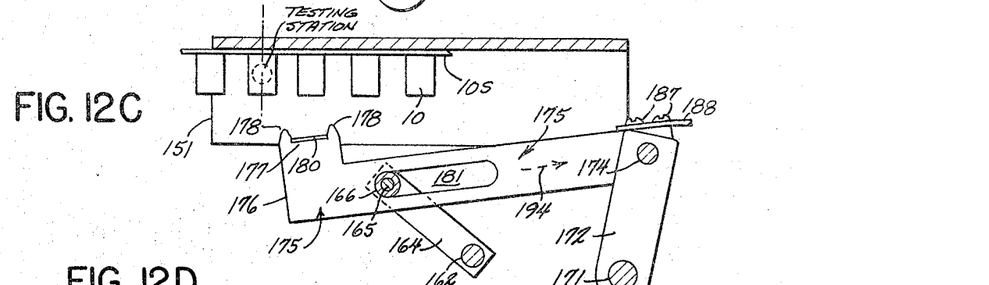
Figure 12D:
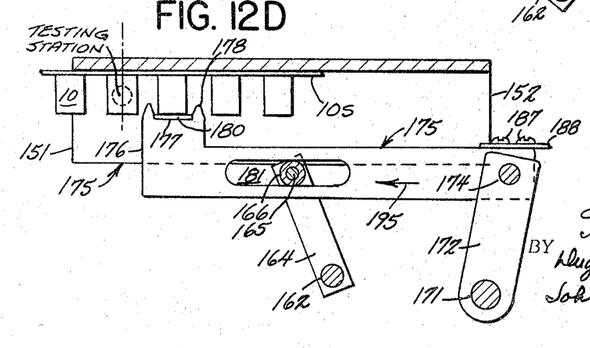

The rotary solenoid 161 is provided with an internal-return spring normally causing rotation in a clockwise direction to the limiting position shown in FIGURE 10 and FIGURE 12A. When the rotary solenoid 161 is energized, its internal-return spring is overpowered, and rotation sufficient to bring the crank arm 164 to the position shown in FIGURES 12A and 12C ensues. When the rotary solenoid 170 is energized (and assuming that the pad 180 of the perch surface 177 is not in engagement with a cup 10), the rotary solenoid shaft 171 will turn, against the action of spring 184, to the limiting position shown in FIGURES 12C and 12D. On the upper surface of the reach arm 170 and at the rear end thereof, by means of screws 187, there is attached a leaf spring 188. Spring 188 curves rearwardly and downwardly and is provided with a down-turned rear end 188A (see FIGURE 10) which is adapted to engage in a ratchet-like manner, the upper teeth of a small spur gear 189 that is rotatably mounted on the shaft 190. The gear 189 has fastened to it a circular wheel weight 191, which also rotates with the gear on the stub shaft 190 mounted on rear frame extension 168R. Whenever the reach arm 175 moves rearwardly from a position such as that shown in FIGURES 12A and 12B to a position such as shown in FIGURES 12C and 12D, the spring 188 will be pushed backwardly and its rear end 188A will ratchet over the the teeth of the gear 189, which due to inertia, will not rotate due to the ratcheting. This is preparatory to dragging the gear 189 and weight 191 forwardly to rotate them when the reach arm 175 moves forwardly. This provides a certain amount of drag to prevent the too rapid forward movement of the reach arm 175, which might tend to disturb fluids in the cups 10.

When each of the rotary solenoids 161 and 170 are de-energized, a condition maintained during the testing operation, the reach arm 175 and associated parts will be in the position shown in FIGURE 12A. When the rotary solenoids are simultaneously energized, the solenoid 161 will rotate from the position shown in FIGURE 12A to the position shown in FIGURE 12B, thereby moving its crank arm 164 in the counter clockwise direction, as shown by the dotted arrow in FIGURE 12B, and consequently the roller 166, bearing upon the slot 181, causes the front end of the reach arm 175 to be moved downwardly, so as to withdraw the pad 181 on perch seat 177 from engagement with the bottom of the cup 10 with which it has last been in engagement, as shown in FIGURE 12A. Simultaneously, the energization of the rotary solenoid 170 will cause its actuation, but it will move a little slower, due to its larger size, and when it does begin to move the perch seat 180 of the reach arm 175 has already been withdrawn a short distance downward away from the bottom of the cup 10, and thereby the tips 178 are not obstructed engagement with the cups 10 in succession on the strip 10S. As a consequence, the rotation of the rotary solenoid 170, and its shaft 171 will cause the crank 172 to be moved in the direction of the dotted arrow in FIGURE 12C from the position shown in FIGURE 12A to the rearward limit position shown in FIGURE 12C, thereby dragging the entire reach arm 175 rearwardly in the direction of the dotted arrow 194, in FIGURES 12B and 12C, thereby pulling the slot 181 along the roller 166 on crank 164 of the rotary solenoid 161, to the rear limit position shown in FIGURE 12C. Then, the rotary solenoids are again simultaneously de-energized, and when this occurs the rotary solenoid 161, is quickly returned by its spring from the position of FIGURE 12C to the position shown in FIGURE 12D thereby engaging the pad 180 on the perch surface 177 into engagement with the next rearward cup 10 in the strip. The return movement of the rotary solenoid 170 and its associated shaft 171 and crank arm 172 from the position shown in FIGURE 12D forwardly to position shown in FIGURE 12A does not occur quite so fast due to the drag imposed by the spring 188 hooking onto the teeth of the gear 189, and while the spring 184 does permit the forward motion, it is at a controlled slower rate, and this permits the solenoid 161 and crank 164 to return to the de-energized condition and this allows the upward engagement of the front end of the reach arm 175 against the lower surface of the next rearward cup 10, as shown in FIGURE 12D and then solenoid 170 and crank 172 complete their return and this pushes reach arm 175 in the direction of the solid arrow 195 in FIGURE 12D until the parts have resumed the position in FIGURE 12A. This advances the whole strip 10S and the next rearward cup 10 which has been engaged by the reach arm 175. This action pushes cup 10 and the entire strip 10S and all cups thereon forwardly, thereby bringing a fresh and clean cup 10 into position under valve plate 106 to be filled with the plasma and reactants for the next test.

Referring now to FIGURES 16 and 17, in FIGURE 16, at the left hand side, there is illustrated timer motor 200 which through an appropriate gearing and drive shaft illustrated at 201 drives three cams TC1, TC2 and TC3. These cams are shown schematically in FIGURE 17. Each of these cams rotates in the direction of arrow 202. The complete rotation of 360 degrees is accomplished in a certain time period, which can for example, be twenty seconds. There is a dwell period beginning at the zero degree (or starting) line of the cams and extending approximately to the three degree line, thereby providing a dwell of say, one-half second. All of the cams have their leading edges along the three degree line at the end of the dwell period and all are operated simultaneously as rotation begins, rotation being in the direction of arrows 202.

Each of the cams is provided with an operator roller, thus roller 204 for cam TC1; 205 for cam TC2 and 206 for cam TC3. The roller 204 operates the switch element 207; roller 205 operates switch element 208 and roller 206 operates switch element 209.

Referring to the multiple rotary valve 106, the metal tube 114 has connected to it lead 210 which extends through resistor 211 to junction 212 and thence to the B+ supply, it being understood that B− is grounded. From junction 212 a circuit extends through the operating coil 214 of relay K1 and thence to output 215 of transistor amplifier 216 having a ground lead 217 and an input lead 218. The input lead is connected back to the metallic tube 110 of the multiple rotary valve 106. Assuming the valve 106 to be in the position shown in FIGURE 13, and that vacuum is applied to tube 114, then if the flexible tube 103 connected to the metallic tube 110 (see FIGURES 8 and 16) is then dipped into a sample of plasma fluid, the plasma will be drawn through the tube 110 and thence through the borehole 107A in the valve disc 107D and thence to vacuum line 114 thereby establishing a circuit between the metallic tubes 110 and 114, and hence between the lead wires 210 and 218. This serves to apply B+ potential through resistor 211 and thence via lead wire 210 to tube 114, thence through the plasma within the borehole 107A and thence through tube 110 and lead wire 218 to the input of transistor amplifier 216. The amplified output at terminal 216 of the transistor flows from ground G through transistor 216 and lead 215, then through coil 214 of relay K1, and thence to the B+ supply. Relay K1 is thereupon energized and operated. The energization of relay K1, which is normally open, closes its contact 219 against contact 220 thereby establishing a circuit from line L1 to junction 221 and line 222 and through contacts 219 and 220 and line 224 to junction 225 and through timer motor 200 to line L2. From junction 221 a circuit also extends via line 226 and contact 227 through contact 209 operated by cam TC3, when it is operated, thence via contact 228 to junction 225 and through timer motor 200 to line L2. The contacts 219 and 220 of relay K1 are therefore in parallel with the contacts 227-209-228 operated by cam TC3. The initial energization of the timer motor 200 accordingly occurs by virtue of the operator holding a vial of plasma so that the inlet tube 103 may draw the plasma through the valve disc 107D and this causes the energization of relay K1, as previously described, thereby closing the contacts of that relay so as to cause energization of the timer motor 200 which therefore begins to operate. Rotation of the motor 200 almost immediately (½-second) brings the leading edges of the cams TC1, TC2 and TC3 against their rollers 204, 205 and 206 causing the operation of these cam switches 207, 208 and 209 respectively. The closure of normally open cam switch TC3-209 provides a sustaining circuit which will therefore maintain the motor 200 energized until all of the cams have made one complete turn, at which time the trailing edge of cam TC3 will go out of contact with the roller 206 thereby opening the switch 227-209-228, and timer motor 200 thereupon becomes de-energized. Timer operator switch TC1-207 has a pair of normally closed contacts 230—230 (which are closed at the dwell of cam TC1) and a pair of normally open contacts 231—231. From supply line L1 a circuit extends via line 232 to the lower of the normally closed contacts 230 thence through cam switch element 207 to the upper contact 230 and via line 234 to one terminal 235 of the pump motor 132, from the opposite terminal 236 of which a circuit extends via lines 237 to junction 238 and thence via junction 239 to supply line L2. This means that when the timer motor has completed a cycle and has brought all of the timer switches TC1-207; TC2-208 and TC3-209 to the stopping position, cam switch TC1-207 will be in engagement with the contacts 230 thereby energizing the pump motor 132, which accordingly keeps the pumps 134 and 135 in continuous operation, and these as previously described, continuously circulate the thromboplastin suspension through valve element 108D and the calcium chloride solution through valve element 109D, thereby continuously keeping the boreholes through these valve elements filled with the liquids which they, respectively, control. Also when the timer motor 200 initiates its operation, and TC1-207 operates, it will open the circuit through contacts 230, and this stops the pump motor 132. This precaution is taken so that the pumps 134 and 135 will not operate against the valves 108D and 109D, almost simultaneously move to the positions shown in FIGURE 14 where the circulating lines of these liquids are closed off. This spares the development of excess pressure via pumps 134 and 135 and obviates the necessity for over-pressure bi-pass lines and valves which would otherwise be required.

The switch TC1-207 has normally open contacts 231 through which a circuit extends from line L1 via line 232, contacts 231, line 240 to junction 241. From junction 241 a circuit extends at 242 through the coil of a compressed air control valve 244 and thence via junction 245, line 246, junction 238 and junction 239 and to supply line L2. Also, from junction 241 a circuit extends via line 247 through the coil 248 of relay K3 and thence via line 249 and junctions 245, 238, 239 to line L2. Therefore, as soon as timer switch TC1-207 has operated to close its contactor 207 against the contacts 231, circuits will simultaneously be established through the compressed air control valve 244 which normally closes its fluid circuit, and will upon energization open such fluid circuit, and also simultaneously energizes relay K3. The energization of the control valve 244 allows compressed air from supply 250 to be delivered through the valve 244 to line 251 and thence to junction 252 and via line 254 to inlet tube 116 of valve 208 and also via line 255 to inlet tube 112 of the valve 209. This causes the simultaneous application of compressed air, into the tubes 112 and 116, and this will cause the reacting fluids to be blown out, i.e. "injected" into the cup 10, when, simultaneously as will be shown, the three valve elements in the valve 106 are actuated to the "injection" position.

Operation of the valve elements for "injection" is accomplished through contact K3A of the relay K3. This is accomplished by a circuit extending from line L1 through the rotary valve drive solenoid 125 and thence via line 256 and contacts K3A and 257 of the relay K3 to junction 239 and thence to supply line L2. This causes the actuation of the rotary valve drive solenoid 125, and hence, since air is supplied to tubes 112, 116 of the rotary valve 106, the reactants will be blown down, as previously described and "injected" into the cup 10. The contact K3B of the relay K3 simultaneously closes against contacts 258 of the relay, and a circuit is established from B+, thence via contacts K3B-258 and through junction 259 and thence through the coil 260 of relay K4 and through the normally closed contacts K24-261 of the relay K2 to gorund G. This causes the energization of relay K4. A circuit is thereupon established through relay contacts K4A–264 from line L1 through the printer timer motor 262 and thence through the closed contact K4A–264 to line L2. Relay K4 accordingly causes the printer timer and printer timer motor to be operated. The printer timer is a standard article of manufacture, and therefore need not be further described other than to mention that when it is energized it will begin to operate its own timing cycle, and when it is de-energized it will print the elapsed time from energization to de-energization on a strip of paper, card or roll tape. The printer timer is of particular usefulness in a machine of this kind since it avoids clerical errors.

It will be noted that a circuit extends in parallel around relay contacts K3B–258 from terminal B+ via line 265 and resistor 266 to junction 259, which according places resistor 266 in parallel with the normally open contacts K3B–258 of the relay K3. Resistor 266 is of such a size that it will not pass enough current to close relay K4, but will pass sufficient current so as to maintain relay K4 closed once it is energized and has closed. Therefore, it is only essential that contacts K3B–258 be closed a short time to insure the initial energization of the relay K4, and then even though relay K3 may later become de-energized and open contacts K3B–258, relay K4 will remain energized and consequently will keep its contacts 264 closed and will maintain the printer timer motor and printer mechanism energized and operating until they are subsequently de-energized by the opening of contacts K2A–261 of the relay K2.

Closure of timer switch contacts TC1–207 as determined by cam TC1, here illustrated as a time period of for example, four seconds, insures that for a short period of time at the beginning of the test, the valve 106 will be maintained operated and air will be supplied to the valve, for blowing down the reactants and then continuing the blowing of air for a very short period to insure mixing of the reacting ingredients in the cup 10. Then cam TC1 opens contacts 231 and closes contacts 230. The opening of the contacts 231 will cause the compressed air valve 244 to de-energize and shut off the blowing air, and will simultaneously de-energize the relay K3. The de-energization of the relay K3 accordingly de-energizes the rotary valve drive solenoid 125, and the rotary valve due to turn spring 130 attached to the crank arm 127, see FIGURES 9 and 10, will rotate the valve discs 107D, 108D and 109D from the "injection" position, shown in FIGURE 14 to the preparatory position shown in FIGURES 13 and 16. Simultaneously the closure of contacts 230 of this timer switch TC1 will re-energize the pump motor 132 and circulation of the thromboplastin and calcium chloride solutions will be resumed through discs 108D and 109D respectively. Meanwhile, the valve disc 107D has returned to its preparatory position, and vacuum will be applied via lines 114 and valve disc 107D to the line 110, preparatory to the initiation of another test.

The reacting ingredients in the cup 10 are meanwhile "viewed" by the light beam 13–13A and the photocell 19 which is accordingly illuminated. The utilization of the signal current from photocell 19 is by way of an amplifier circuit that is essentially the same as that shown in FIGURES 6 and 7, but with slight modification. Thus, from terminal B+ the circuit extends through resistor 20 to Terminal A and thence via capacitor 22 resistor 270, junction 271, to the input terminal 23 of the transistor 24. The connection from capacitor 22 is in this instance made through a resistor 270 and junction 271 to input terminal 23, for a purpose to be described, and in this respect differs from the circuit of FIGURES 6 and 7. A diode 274 is connected between junction 271 and ground G. The remainder of the circuitry from transistor 24 to the right, as shown in FIGURE 16 is the same as the amplifier portion of FIGURE 7, with these differences: In this instance, coil 272 of relay K2 is connected across junctions 40 and 56 rather than the coil 60 as shown in FIGURE 7. Also, the grid 52 of amplifier 54 is connected to one of the terminals 275 which is closed by the timer switch element TC2–208, the other terminal 275 being connected to junction 36.

The operation of the circuitry responsive to the photocell signal is therefore as follows: As the light transmitted through the sample decreases in amount, during the process of the clotting reaction, the first derivative of the signal current, as amplified, will be indicated by the meter 26, all as previously described. As the rate of decrease of light transmission approaches a minimum (in the neagtive sense) in the vicinity of inflection point P1, the meter 26 will approach a low reading, then immediately after passing the point of inflection P1, and as the transmitted light again sharply further decreases, the first derivative of the signal input will again cause the reading on meter 26 rapidly to rise. The result of this signal current through the amplifiers 38 and 54, is as previously described, and causes the energization of relay coil 272 to occur as the first derivative signal (rate of decrease of light transmitted) again begins to increase (in a negative sense) at point P1. This causes the energization of relay K2, which consequently opens contacts K2A from contacts 261, thereby de-energizing the relay K4, which thereupon opens its contact K4A, and de-energizes the printer timer motor and printer mechanism. Such de-energization causes the immediate printing out of the time reading, which was begun upon initiation of the testing operation and ceased at point P1, thus defining time period T1. The operation of relay K2 also closes the contacts K2B against the contacts 277, thereby establishing a circuit from line L1 through the rotary solenoids 161 and 170 and thence to contacts K2B–277 to line L2 and this accomplishes the advancement of the strip 10S carrying cups 10 thereon, so as to advance the cup 10 which has just been tested and bring forward a fresh, unfilled cup into position under valve plate 106 preparatory to the next test.

It will be noted that timer switch TC2–208 closed against its contacts at the beginning of the timing cycle, but opened after a prescribed time period, here illustrated as fifteen seconds, which is selected as being less than the shortest "prothrombin time" determination that will be made. The closure of switch TC2–208 established a circuit between the two grids 37 and 52, and thereby assured that the initiation of the testing procedure the grids of the two amplifiers 38 and 54 are brought into balance, it being noted that the movable contact 47 on potentiometer resistor 71 permits a preliminary adjustment of these amplifiers, so that when the grids 37 and 52 are at the same potential and that the output terminals 40 and 56 are likewise at the same potential, thereby not energizing the coil 272. However, before the expiration of the shortest "prothrombin time" determination occurs, the switch TC2–208 opens, and thereby permits the voltages on grids 37 thereafter to be controlled by the input signal received through the diodes 35 from junction 37.

Also at the time the test is complete in a "prothrombin time" determination, the light transmission through reactants is at a minimum, and therefore when the strip 10S is advanced, so as to bring an empty cup 10 into position, the photoelectric cell 19 will be illuminated again at a much higher level, thereby imposing a "high illumination" signal on Terminal A. This, in effect, causes Terminal A to "go negative," and in order to "recharge" condenser 22, a flow of electrons must occur between the condenser and ground G. The diode 274 will permit this flow from ground thence via the resistor 272 and condenser 22, thereby recharging the capacitor 22 in pace with the negative signal imposed upon it by Terminal A. This is the function of the diode 274. The condenser 22 is thereupon brought quickly into a condition for the next subsequent test, a condition of operation which is desirable when tests are made in succession rapidly and automatically.

As many widely apparently different embodiments of

What is claimed is:

1. The method of measuring the prothrombin time of blood plasma which comprises mixing a sample of plasma with a clotting agent, passing light through the sample as it clots, generating a primary signal proportional to the transmitted light, obtaining a secondary signal from the primary signal, said secondary signal being the first derivative of the primary signal and measuring the time period for clotting of the plasma sample ending when said secondary signal begins to change after having reached a steady value.

2. The method of claim 1 further characterized in that the ending of the time period is measured when the secondary signal is substantially at a minimum value.

3. The method of claim 1 further characterized in that the ending of the time period is measured when the secondary signal reaches a maximum after having reached a first minimum.

4. The method of measuring the prothrombin time of blood plasma which comprises substantially simultaneously injecting into a transparent vessel pre-measured volumes of blood plasma and reactants for clotting, projecting a light beam against the vessel so as to permit it to pass therethrough, collecting the transmitted light and generating a primary signal proportional thereto, transferring the primary signal capacitatively and thereby generating a secondary signal which is the first derivative of the primary signal, and measuring the time for clotting of the plasma, ending substantially when said secondary signal first reaches a minimum value.

5. The method of measuring the prothrombin time of blood plasma which comprises substantially simultaneously injecting into a transparent vessel pre-measured volumes of blood plasma and reactants for clotting, projecting a light beam against the vessel so as to permit it to pass therethrough, collecting the transmitted light and generating a primary signal proportional thereto, transferring the primary signal capacitatively and thereby generating a secondary signal voltage which is the first derivative of the primary signal, and measuring the time for clotting of the plasma, ending substantially when said secondary signal reaches a maximum after having first reached a minimum.

6. Apparatus for measuring the prothrombin time of blood plasma which comprises a container for the plasma sample, light means on one side of the container for projecting a beam of light therethrough, light responsive means having a signal output, said light responsive means being responsive to light transmitted through the container and plasma sample therein for generating a primary signal which is a function of the amount of transmitted light, means connected to said light responsive means, signal output for generating a secondary signal which is the first derivative of the primary signal and means in said apparatus and responsive to said secondary signal for denoting the end of said prothrombin time period.

7. The apparatus of claim 6 further characterized in that said means for denoting the end of said prothrombin time period is responsive when the secondary signal reaches substantially a first minimum.

8. The apparatus of claim 6 further characterized in that said means for denoting the end of said prothrombin time period is responsive when the secondary signal reaches substantially a maximum after having reached a first minimum.

9. The apparatus of claim 6 further characterized in that said means for denoting said prothrombin time includes a printer for printing said prothrombin time.

10. The apparatus of claim 6 further characterized in that it includes means responsive to the receiving of the plasma sample in the apparatus for initiating measurement of said prothrombin time.

11. The apparatus of claim 6 further characterized in that said means for generating a secondary signal is connected to said signal output by means of a capacitative coupling.

12. The apparatus of claim 6 further characterized in that said means for denoting said prothrombin time includes starting means responsive to the sample of plasma being introduced into said apparatus.

13. The apparatus of claim 6 further characterized in that means is provided for separately measuring amounts of plasma and reagent required for producing clotting thereof and for substantially simultaneously introducing said measured amounts into said container.

14. The apparatus of claim 6 further characterized in that multiple valve means having separate passages for receiving and valving said plasma and reagents of said clotting reaction, and means is provided responsive to plasma being fully received in its passage of the valve means for operating said valve means to a delivery position for substantially simultaneously delivering said plasma and reagents of said clotting reaction to said container.

15. The apparatus of claim 6 further characterized in that a plurality of containers are provided on a common carrier for successive use in making prothrombin time measurements of successive samples of blood plasma, and means is provided on the apparatus and operative when the prothrombin time measurement is completed for advancing said carrier and containers so as to bring a next empty container to light transmitting position for receiving and testing another plasma sample.

16. An apparauts for measuring prothrombin time of blood plasma comprising a frame having ways thereon for receiving and guiding a carrier which has a plurality of containers thereon, said frame having testing station, a light source and photocell signal means mounted on the frame in positions so that a beam of light is projected against and through a container when said container is at the testing station and on to said photocell for producing a signal, separate receivers on said frame for plasma and such reagents as are required for a standardized plasma clotting test, means responsive to receipt of plasma in its receiver for substantially simultaneously delivering said plasma and reagents from said receivers to a container on said carrier for testing therein, and transfer means responsive to the light signal from said photocell for moving said carrier and containers on said ways sufficiently to bring another container into testing position.

17. The apparatus of claim 16 further characterized in that said receivers are located adjacent the testing station for delivering said plasma and reagents into the container at said testing station.

18. The apparatus of claim 16 further characterized in that said receivers are rotary valve elements and are coupled together for simultaneous rotation of each valve element from a loading position to a delivery position.

19. The apparatus of claim 18 further characterized in that separate pump means is provided for each rotary valve element which receives and valves a reagent and is connected thereto for continuous recirculation of the reagent through the valve element when in said loading position.

20. The apparatus of claim 19 further characterized in that means is provided to stop each pump means when its valve means is in delivery position.

21. The apparatus of claim 18 further characterized in that pressure means is provided for each valve element for delivering the fluid therein to said container when the valve element is in delivery position.

22. The apparatus of claim 18 further characterized in that suction means is provided for the valve element handling plasma for drawing plasma into said valve element preparatory to delivering the same therefrom.

23. The apparauts of claim 22 further characterized in that start signal means is provided on the valve element handling plasma for generating a signal when said element is filled with plasma.

24. The apparatus of claim 23 further characterized in that actuating means for all of said valve elements is provided for moving them from loading positions to delivery position and said actuating means is connected to said start signal means so as to be responsive thereto.

References Cited by the Examiner

UNITED STATES PATENTS

| | | |
|---|---|---|
| 2,878,715 | 3/1959 | Rhees. |
| 2,879,141 | 3/1959 | Skeggs. |
| 3,158,445 | 11/1964 | Huff. |
| 3,244,059 | 4/1966 | Simpkins ___________ 88—14 X |

DAVID SCHONBERG, *Primary Examiner.*